US008360518B2

(12) United States Patent
Braaten

(10) Patent No.: US 8,360,518 B2
(45) Date of Patent: Jan. 29, 2013

(54) WHEELCHAIR LIFT ASSIST MECHANISM

(76) Inventor: David Braaten, Sunburg, MN (US)

( * ) Notice: Subject to any disclaimer, the term of this patent is extended or adjusted under 35 U.S.C. 154(b) by 152 days.

(21) Appl. No.: 12/891,797

(22) Filed: Sep. 27, 2010

(65) Prior Publication Data

US 2012/0074668 A1 Mar. 29, 2012

(51) Int. Cl.
*B62M 1/14* (2006.01)

(52) U.S. Cl. .............. 297/183.6; 297/DIG. 10; 5/81.1 R

(58) Field of Classification Search ............... 297/183.6, 297/331, 335, DIG. 10; 5/81.1 R, 87.1
See application file for complete search history.

(56) References Cited

U.S. PATENT DOCUMENTS 2,442,303 A 8/1945 Mayfield
2,539,034 A 9/1948 Ruby
3,061,365 A * 10/1962 Frieberg ..................... 297/183.6
3,091,426 A * 5/1963 Bogart ................... 297/DIG. 10
3,640,566 A * 2/1972 Hodge ................... 297/DIG. 10
3,915,494 A 10/1975 Somerset ...................... 297/339
3,954,195 A 5/1976 Deuchar ......................... 214/82
4,455,029 A 6/1984 Taylor .......................... 280/5.28
4,519,649 A 5/1985 Tanaka et al. ................. 297/316
4,569,556 A 2/1986 Pillot ............................ 297/316
4,573,736 A 3/1986 Levenberg .................... 297/339
4,598,944 A * 7/1986 Meyer et al. ............... 297/183.9
4,632,455 A 12/1986 Schiller et al. ................ 297/326
4,690,457 A 9/1987 Poncy et al. .................. 297/337
4,838,612 A 6/1989 Cross ............................ 297/338
4,907,303 A 3/1990 Baird ................................ 4/480
4,929,022 A 5/1990 Geraci .......................... 297/313
4,979,726 A 12/1990 Geraci .......................... 297/313
5,082,327 A 1/1992 Crisp ............................ 297/313
5,108,202 A 4/1992 Smith ........................... 297/330
5,312,157 A * 5/1994 Logan, Jr. .............. 297/DIG. 10
5,316,370 A 5/1994 Newman ....................... 297/313
5,498,064 A 3/1996 Hooker et al. ................ 297/339
5,513,867 A 5/1996 Bloswick et al. .......... 280/250.1
5,596,775 A * 1/1997 DiMatteo et al. ............ 5/81.1 C
6,425,634 B1 7/2002 Romero ........................ 297/331
6,454,285 B1 * 9/2002 Koenig ...................... 280/250.1
6,851,751 B1 2/2005 Romero et al. ............... 297/331
7,000,988 B2 2/2006 Bressler et al. ............... 297/325
7,434,882 B1 10/2008 Hodges ......................... 297/335
7,669,863 B2 3/2010 Steiner ....................... 280/87.05
7,735,926 B1 6/2010 Combs .......................... 297/339

* cited by examiner

*Primary Examiner* — Peter R. Brown
(74) *Attorney, Agent, or Firm* — Antonio Papageorgiou; Ostrow Kaufman LLP

(57) ABSTRACT

A wheelchair lift assist mechanism (10) is provided that includes a structure having a seat portion (18) and comprised of a seat (20) inter-connected with a tube (22) a bar (24) and bracket (30) fastened by bolts (28) joined to a handle (26) and attachable to a wheelchair (12). The mechanism (10) capable of supporting and boosting a patient (14) to a standing position by an assistant (16).

11 Claims, 9 Drawing Sheets

WHEELCHAIR LIFT ASSIST MECHANISM

BACKGROUND OF THE INVENTION

The present application relates to lift assist mechanisms in particular to those mechanisms attached to wheelchairs.

In today's society there are many individuals who have the ability to ambulate but are not capable of going from a sitting to a standing position from a wheelchair or a regular armchair. Without the use of a lift or the assistance of two or more adequately trained persons the individual is confined to the chair. This is a very sad situation when many willing volunteers, friends and family are available to assist the elderly and infirm.

Manual and hydraulic lifts are available as separate free-standing transfer systems. These systems, however, require at least one trained operator to use them and are owned at great expense.

Various attempts have been made to provide lift assists to the configuration of a wheelchair. In most instances, however, the configurations result in costly specialized, custom constructed wheelchairs. No configuration is available for a standard designed wheelchair, as used today in the majority of hospitals, clinics and nursing facilities.

Accordingly there is a need for a wheelchair lift assist mechanism easily fit to an existing wheelchair or armchair and simple to use by a single untrained volunteer, friend or family member.

SUMMARY OF THE INVENTION

In at least one aspect of the present application a mechanism for assisting an individual out of a wheelchair from a sitting position is provided, the mechanism comprising: a seat portion; at least one bar pivotally attached to the seat portion; one or more handles extending outward from the at least one bar; and an attachment mechanism attachable to an arm of the wheelchair, the attachment mechanism pivotally attached to the at least one bar between the seat portion and the one or more handles.

In one embodiment, the seat portion comprises a seat having a first side and a second side opposite the first side, and wherein the at least one bar is pivotally attached to at least one of the first and the second sides of the seat at a pivot point.

In one embodiment, the pivot point is located between a front of the seat and a back of the seat.

In one embodiment, the pivot point is located off center toward the back of the seat.

In one embodiment, the mechanism comprises a first bar pivotally attached to the first side of the seat and a second bar pivotally attached to the second side of the seat.

In one embodiment, the seat comprising a plurality of tubes and a fabric fastened to the tubes, each of the tubes extending from a front of the seat to the back of the seat.

In one embodiment, the attachment mechanism comprises a J shaped bracket.

In one embodiment, the attachment mechanism is pivotally attached at a point on the one or more bars between the seat portion and the one or more handles such that when attached to an arm of the wheel chair the one or more bars is oriented from about 35 degrees to about 55 degrees to a horizontal upward and toward the rear of the seat.

In another aspect, a mechanism for assisting an individual out of a wheelchair from a sitting position, the mechanism comprising: a seat portion comprising a seat having a first side and a second side opposite the first side; a first bar and a second bar, the first bar pivotally attached to the first side of the seat and the second bar pivotally attached to the second side of the seat, each of the bars attached at a pivot point located between a front of the seat and a back of the seat off center toward the back of the seat; one or more handles extending outward from the at least one bar; and an attachment mechanism attachable to an arm of the wheelchair, the attachment mechanism pivotally attached to the at least one bar between the seat portion and the one or more handles.

Additional aspects of the present invention will be apparent in view of the description which follows.

DETAILED DESCRIPTION OF THE INVENTION

Figure 1:
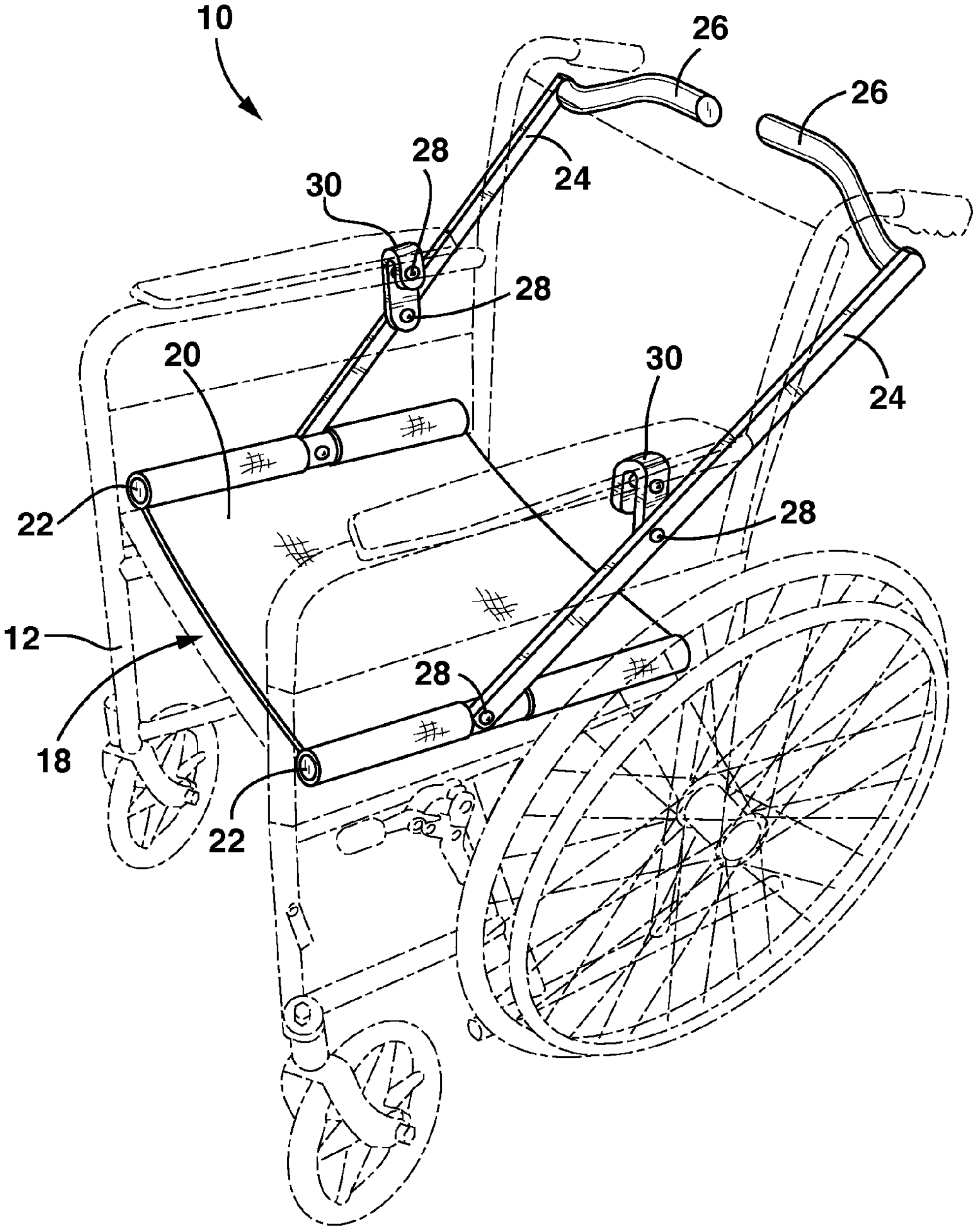
FIG. 1 is a perspective view of the wheelchair lift assist mechanism.
Figure 2:
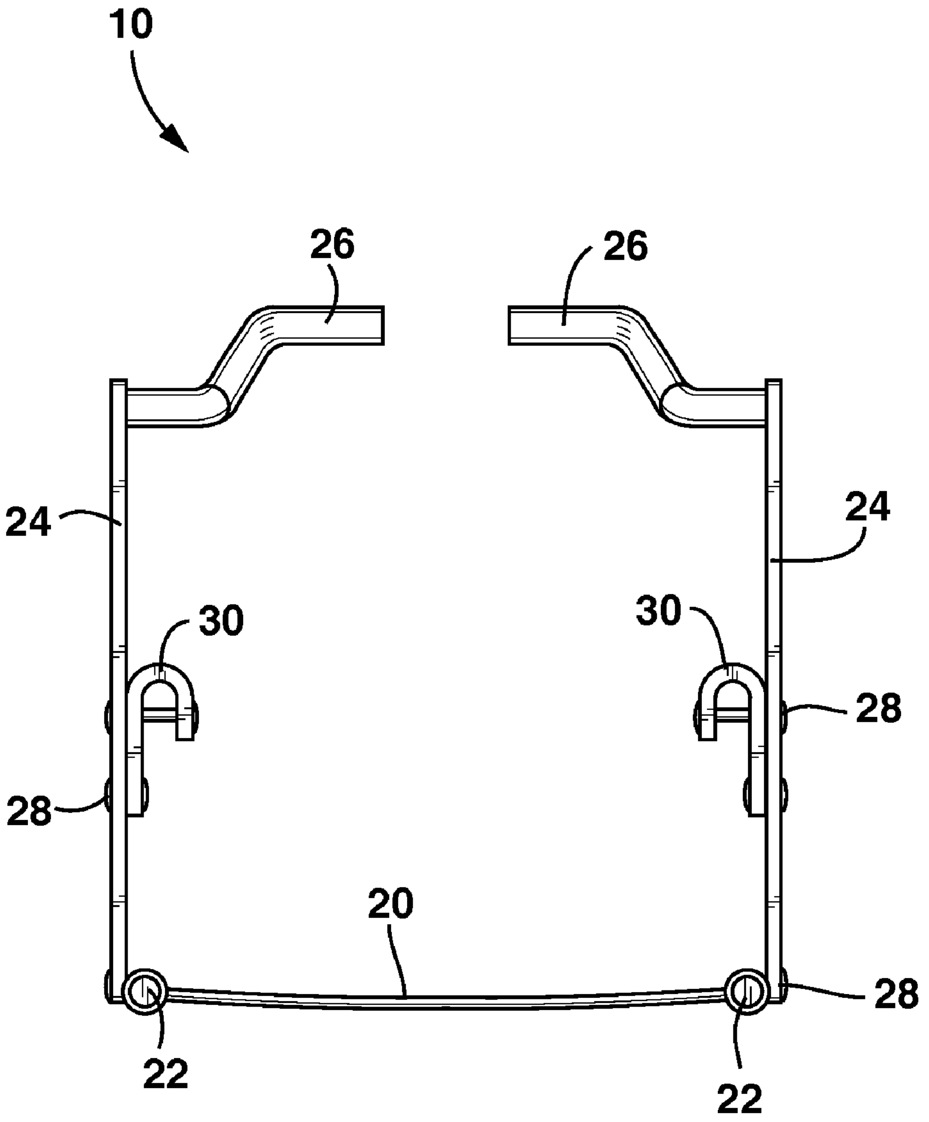
FIG. 2 is a front view of FIG. 1.
Figure 3:
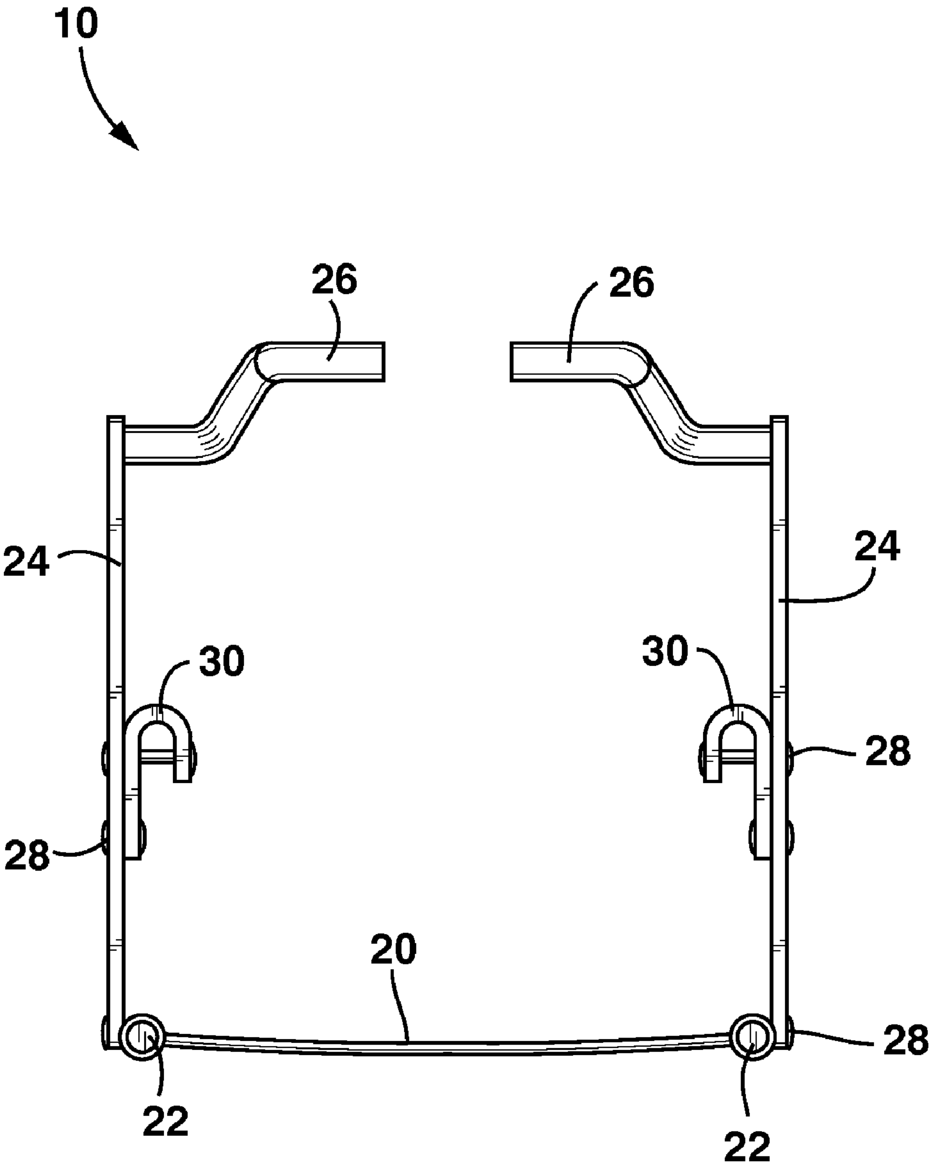
FIG. 3 is a back view thereof.
Figure 4:
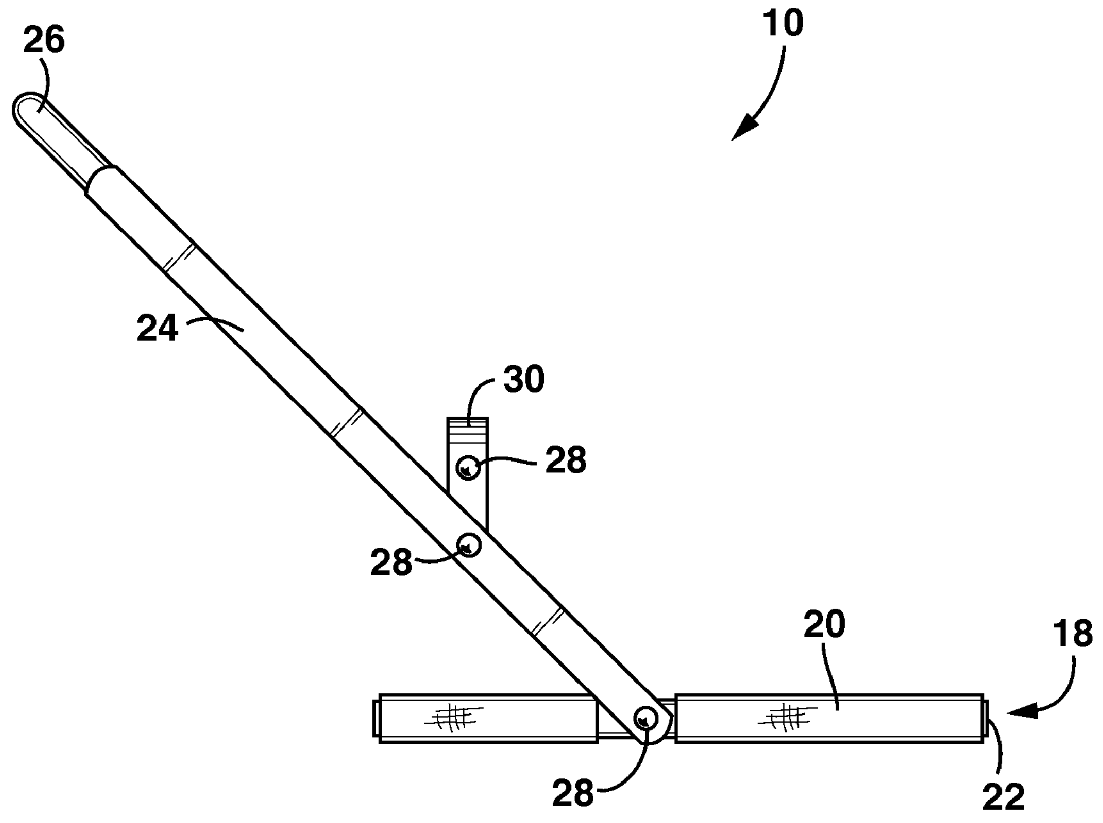
FIG. 4 is a left side view thereof.
Figure 5:
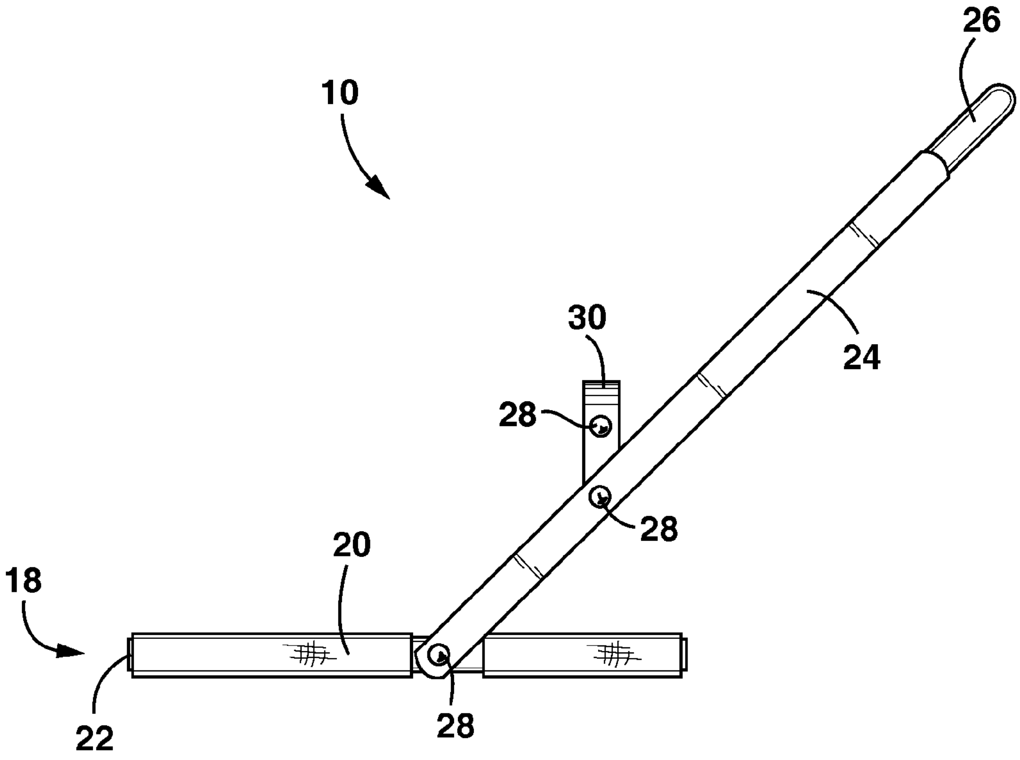
FIG. 5 is a right side view thereof.
Figure 6:
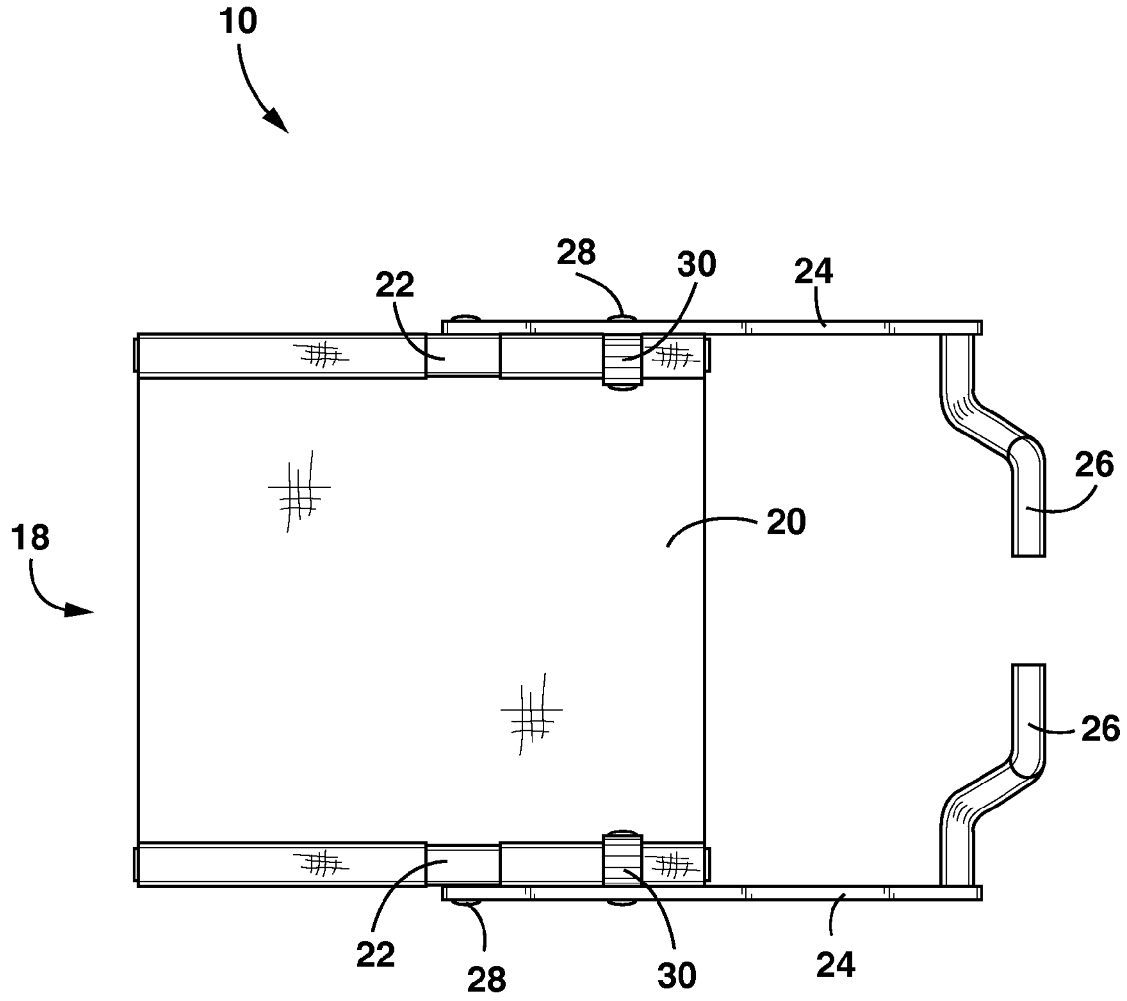
FIG. 6 is a top view thereof.
Figure 7:
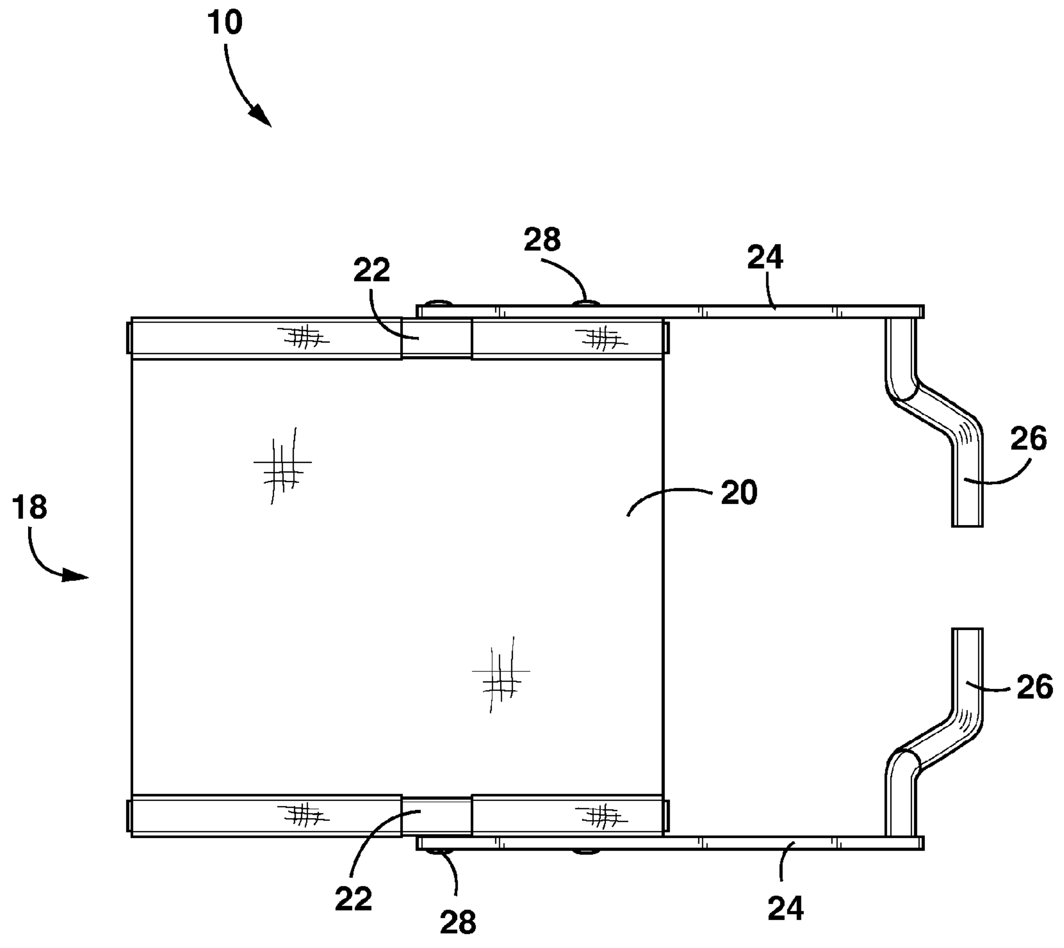
FIG. 7 is a bottom view thereof.

Referring to FIGS. 1-7, various views of the wheelchair lift assist mechanism 10 according to at least one embodiment of the present mechanisms disclosed herein is show. A wheelchair 12 or any type of armchair can be manufactured inclusive of a mechanism 10 or the mechanism 10 can be retrofit to any existing wheelchair 12 or armchair.

The mechanism 10 includes a seat portion 18, one or more bars 24, and one or more handles 26. The one or more bars 24 are pivotally attached on either side of the seat portion 18 at a pivot point. The one or more handles 26 extend outward from the one or more bars 24 opposite the pivot point. The mechanism 10 further includes at least one attachment mechanism 30 or other means for pivotally connecting the mechanism 10 to the armrest of the wheelchair.

In at least one embodiment, the seat portion 18 includes a seat 20 that is made of relatively flexible fabric material. It is understood that the seat 20 may be made of a rigid material or any other suitable material known in the arts. The fabric seat 20 is fastened to one or more tubes or rods 22 extending from the front to the rear of the seat portion 18.

The one or more bars 24 may be pivotally connected to tubes 22 by bolts 28. While the pivot point could be created at any point along the tube 22, in the preferred embodiment the pivot point is set slightly off center of the tube 22 toward the back of the mechanism 10. While in operation this creates the forward tilt of seat 20 when a vertically downward force is applied to the one or more handles 26, which acts to properly erect the patient 14 with the help of assistant 16.

The one or more bars 24 are also connected to the at least one attachment mechanism 30, which in one embodiment is a J shaped bracket pivotally attached to the one or more bars 24 with a bolt 28. The J shaped bracket forms a second pivot point in line with bracket 30, which is hung from one or more arms of wheelchair 12. The bracket 30 can conform to a variety of arm shapes and is shown as conforming to a cylindrical shape, in a preferred embodiment. A bolt 28 fixes the bracket 30 to the arm of the wheelchair 12 in an appropriate location, universally adjustable from chair to chair. The bars 24 are positioned at an approximate angle of 45 degrees to the horizontal upward and toward the rear of the mechanism, typical in most installations, and could be within a range of plus or minus 10 degrees.

One or more handles 26 are fixed to one or more bars 24 in a secure manor. Any type of rigid material such as steel, aluminum, plastic or other materials well known in the arts could be used for this construction.

The operation of the mechanism 10 according to at least one embodiment of the mechanisms discussed herein is described with reference to FIGS. 8-9.

Figure 8:
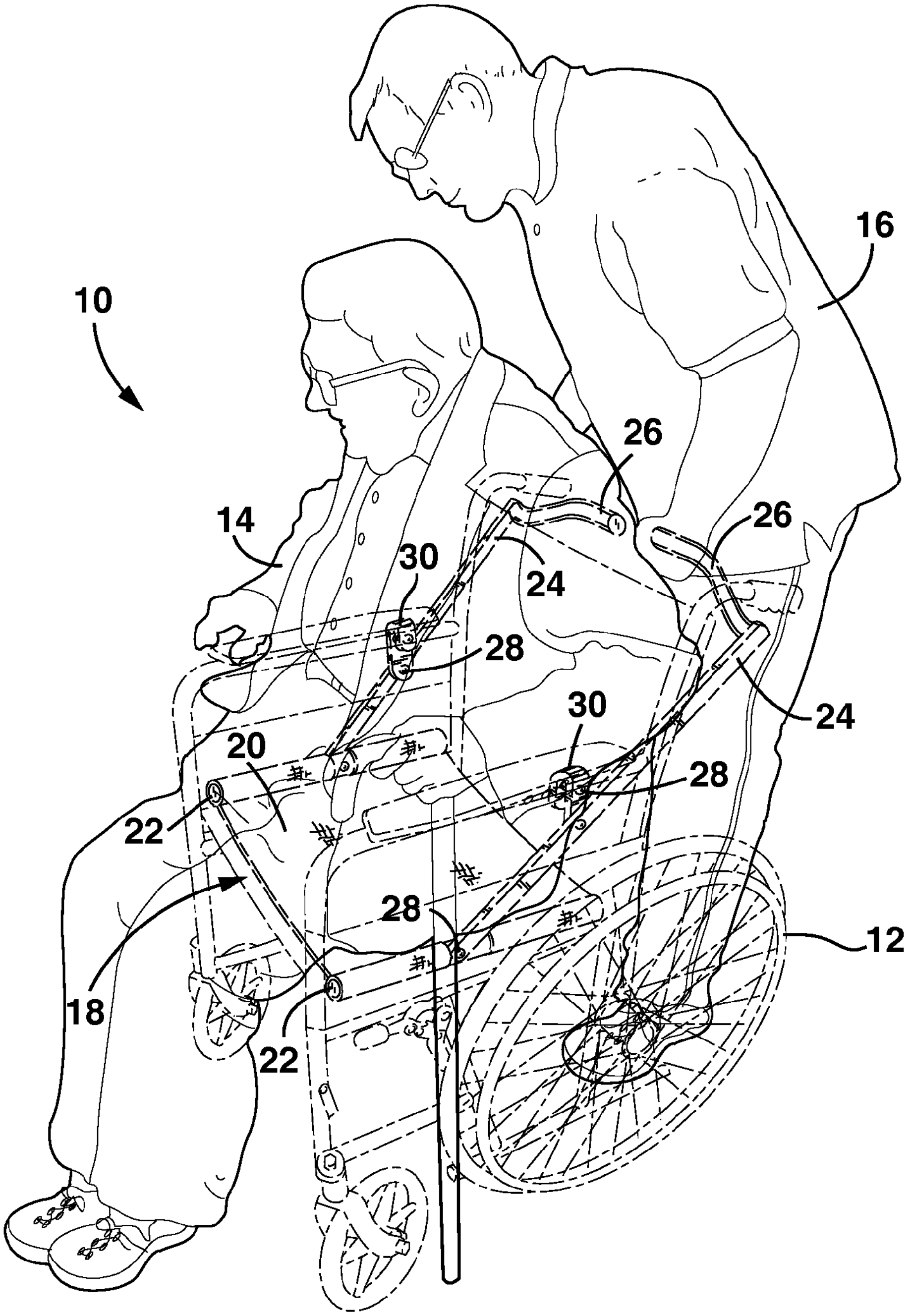
FIG. 8 is a perspective view of an assist mechanism, in use, in it's rest position.

Referring to FIG. 8 a patient 14 is sitting at rest in a wheelchair 12 and is being tended by an assistant 16. The mechanism 10 is in use in a rest position. The seat 20 conforms to the horizontal rest spot of the wheelchair 12. The bars 24 are positioned at an approximate angle of 45 degrees to the horizontal, typical in most installations, and could be within a range of plus or minus 10 degrees. Results are a modest, unobtrusive, simple to install mechanism 10 that is capable of providing comfort for the patient 14.

Figure 9:
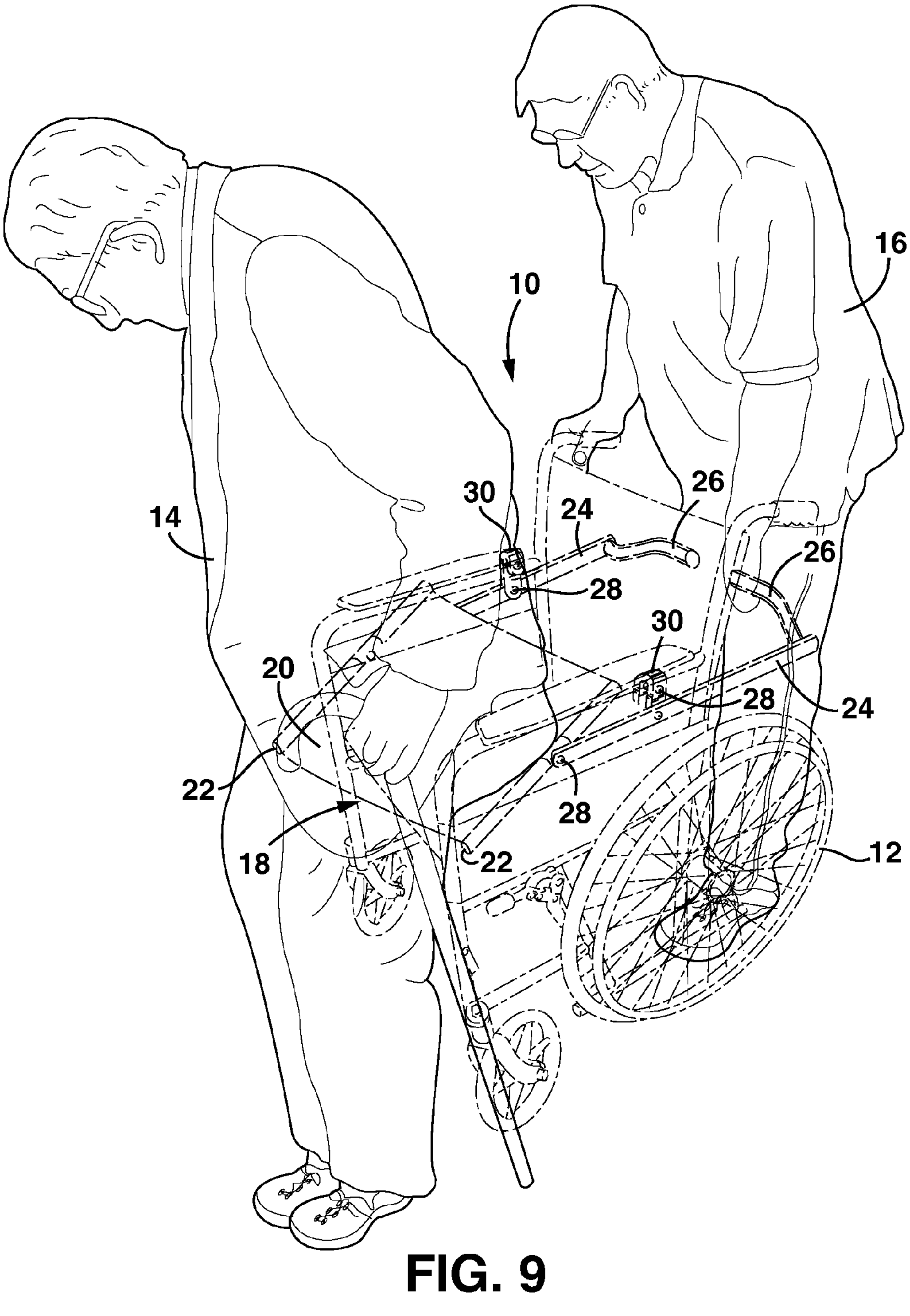
FIG. 9 is a perspective view of an assist mechanism, in use, in an articulated position.

Referring to FIG. 9 a patient 14 is standing, being moved to this position by a vertical downward pressure provided by the assistant 16 via the handles 26. The pressure is transferred through bars 24 to tubes 22 respectively raising seat 20 which tilts forward raising and ejecting patient 14 to a standing position. Results are ease of use by an untrained assistant 16 that is providing a force capable to assist an ambulatory patient 14 to stand.

While the foregoing invention has been described in some detail for purposes of clarity and understanding, it will be appreciated by one skilled in the art, from a reading of the disclosure, that various changes in form and detail can be made without departing from the true scope of the invention.

What is claimed is:

1. A mechanism for assisting an individual out of a wheelchair from a sitting position, the wheelchair having a seat and a seatback, the mechanism comprising:

a seat portion;

at least one bar pivotally attached to the seat portion;

one or more handles extending outward from the at least one bar opposite the attachment to the seat portion; and an attachment mechanism attachable to the wheelchair, the attachment mechanism pivotally attached to the at least one bar between the attachment to the seat portion and the one or more handles, wherein when attached the seat portion sits over the seat of the wheelchair and the at least one bar extends rearward so that the one or more handles are located behind the seatback of the wheelchair, and wherein an individual is assisted out of the wheelchair from a sitting position by an assistant applying a force to the one or more handles located behind the wheelchair so as to leverage the individual upward toward a standing position.

2. The mechanism of claim 1, wherein the seat portion comprises a seat having a first side and a second side opposite the first side, and wherein the at least one bar is pivotally attached to at least one of the first and the second sides of the seat at a pivot point.

3. The mechanism of claim 2, wherein the pivot point is located between a front of the seat and a back of the seat.

4. The mechanism of claim 3, wherein the pivot point is located off center toward the back of the seat.

5. The mechanism of claim 2, comprising a first bar pivotally attached to the first side of the seat and a second bar pivotally attached to the second side of the seat.

6. The mechanism of claim 5, the seat comprising a plurality of tubes and a fabric fastened to the tubes, each of the tubes extending from a front of the seat to the back of the seat.

7. The mechanism of claim 1, wherein the attachment mechanism comprises a J shaped bracket hung from an armrest of the wheelchair.

8. The mechanism of claim 1, wherein the attachment mechanism is pivotally attached at a point on the one or more bars between the seat portion and the one or more handles such that when attached to an arm of the wheelchair and the mechanism is in the seating position, the one or more bars is oriented from about 35 degrees to about 55 degrees to a horizontal upward and toward the rear of the seat.

9. A mechanism for assisting an individual out of a wheelchair from a sitting position, the wheelchair having a seat and a seatback, the mechanism comprising:

a seat portion comprising a seat having a first side and a second side opposite the first side;

a first bar and a second bar, the first bar pivotally attached to the first side of the seat and the second bar pivotally attached to the second side of the seat, each of the bars attached at a pivot point located between a front of the seat and a back of the seat off center toward the back of the seat;

one or more handles extending outward from each of the first bar and second bar opposite the attachment to the seat portion; and an attachment mechanism attachable to each armrest of the wheelchair, the attachment mechanism pivotally attached to each of the first bar and second bar between the attachment to the seat portion and the one or more handles, wherein when attached to the wheelchair the seat portion sits over the seat of the wheelchair and the at least one bar extends upward and rearward at an angle from about 35 degrees to about 55 degrees to a horizontal, and wherein an individual is assisted out of the wheelchair from a sitting position by an assistant applying a vertically downward force to the one or more handles located behind the wheelchair so as to leverage the individual upward toward a standing position.

10. The mechanism of claim 9, the seat comprising a plurality of tubes and a fabric fastened to the tubes, each of the tubes extending from a front of the seat to the back of the seat.

11. The mechanism of claim 9, wherein the attachment mechanism comprises a J shaped bracket hung from the armrest of the wheelchair.

* * * * *